(12) United States Patent
Trock

(10) Patent No.: US 12,362,935 B2
(45) Date of Patent: Jul. 15, 2025

(54) BLOCKCHAIN TOKENS

(71) Applicant: TAAL DIT GMBH, Zug (CH)

(72) Inventor: Stanislav Stas Trock, Zug (CH)

(73) Assignee: TAAL DIT GMBH, Zug (CH)

( * ) Notice: Subject to any disclaimer, the term of this patent is extended or adjusted under 35 U.S.C. 154(b) by 349 days.

(21) Appl. No.: 18/018,233

(22) PCT Filed: Mar. 9, 2021

(86) PCT No.: PCT/EP2021/055905
§ 371 (c)(1),
(2) Date: Jan. 26, 2023

(87) PCT Pub. No.: WO2022/022864
PCT Pub. Date: Feb. 3, 2022

(65) Prior Publication Data
US 2023/0291561 A1    Sep. 14, 2023

(30) Foreign Application Priority Data

Jul. 29, 2020    (GB) .................................... 2011753

(51) Int. Cl.
*H04L 9/32*     (2006.01)
*G06Q 20/38*    (2012.01)

(52) U.S. Cl.
CPC ....... *H04L 9/3213* (2013.01); *G06Q 20/3829* (2013.01); *H04L 9/3236* (2013.01); *H04L 2209/56* (2013.01)

(58) Field of Classification Search
CPC . H04L 9/3213; H04L 9/3236; H04L 2209/56; H04L 9/50; H04L 9/3239; H04L 9/3247; G06Q 20/3829; G06Q 20/06; G06Q 20/065; G06Q 20/382
See application file for complete search history.

(56) References Cited

U.S. PATENT DOCUMENTS

2021/0374843 A1\* 12/2021 Kalabic ................... G06F 16/27
2023/0244656 A1\*  8/2023 Bartolucci ................ H04L 9/30
                                                                707/703

FOREIGN PATENT DOCUMENTS

JP    2019508951 A    3/2019
WO    2019116184 A1   6/2019

OTHER PUBLICATIONS

PCT/EP2021/055905 International Search Report and Written Opinion dated Jun. 8, 2021, 15 pages.
GB2011753.7 Report and Examination Opinion dated Feb. 8, 2021, 6 pages.
Andreas M Antonopoulos: "Mastering Bitcoin", Jul. 21, 2017 (Jul. 21, 2017), XP055570487, ISBN: 978-1-4919-5438-6 Retrieved from the Internet: URL: https://www.oreilly.com/library/view/mastering-bitcoin-2nd/9781491954379/ [retrieved on Mar. 18, 2019] abstract CHAPTER 6:—Transactions; p. 117-148, tables 6-1 to 6-4 , figures 6-1 to 6-8.

\* cited by examiner

*Primary Examiner* — Mohammad W Reza
(74) *Attorney, Agent, or Firm* — Messner Reeves LLP

(57) ABSTRACT

A token transaction comprising a first token output, the first token output comprising a first token locking script and a first token amount, wherein the first token locking script comprises a variable component and a constant component, wherein the variable component comprises a first payment address, embedded in a payment template, and wherein the constant component comprises a token mechanics sub-component.

23 Claims, 4 Drawing Sheets

BLOCKCHAIN TOKENS

CROSS REFERENCE TO RELATED APPLICATIONS

This application is the U.S. National Stage of International Application No. PCT/EP2021/055905 filed on Mar. 9, 2021, which claims the benefit of United Kingdom Patent Application No. 2011753.7, filed on Jul. 29, 2020, the contents of which are incorporated herein by reference in their entireties.

TECHNICAL FIELD

The present disclosure relates to a method of sending (e.g. issuing, transferring, splitting, swapping, redeeming) tokens using blockchain transactions.

BACKGROUND

A blockchain enables the transfer of an underlying digital asset using transactions. This digital asset is often referred to as a "cryptocurrency" or a "native token". It is the digital asset that is inherent to the particular blockchain. As an illustrative example, the digital asset of the bitcoin blockchain is known as Bitcoin.

Another type of digital asset that may be transferred using a blockchain is a "token". In the context of blockchain technology, a token is normally created and defined using additional data fields within a transaction. This additional data, call it "token data", is interpreted by users of the blockchain, or users of a particular token protocol, as a token. That is, users agree that a transaction, or more particularly an output part of a transaction, that contains particular token data (e.g. a token protocol flag followed by amount) is to be interpreted as and used as a token. Whoever owns the output, which usually means the user to whose address the output is locked, owns the token. The token can then be used, sold, traded, etc. for a particular purpose according to the particular token protocol. For instance, a cinema ticket may issue tokens to users, who then pay for the token in return for watching a film at the cinema, or a bank may issue tokens in exchange for its clients USD depositions, which may be be used by the clients in regular payments and later exchanged back at the bank for USD by third parties.

SUMMARY

As mentioned above, previous attempts to create tokens using the blockchain involved defining tokens in additional data fields of a transaction, normally by including the token data in an unexecuted part of an output script code or even an additional separate unspendable output of the transaction. These tokens are different from the underlying digital asset (which itself constitutes from its native tokens) of the blockchain on which the tokens are created. That is, a transaction containing a token according to these previous schemes used the underlying digital asset (or "native token") as normal, whilst also creating a new token in additional data structures. The new token was unrelated to the native token. This decoupling of newly created tokens from their native associates requires a burdensome and unnecessary coordination, to achieve which all up-to-date attempts failed, eventually preventing the tokens from reaching intended mass adoption.

According to one aspect disclosed herein, there is provided a computer-implemented method of sending digital tokens using blockchain transactions. Each token is represented by a single unit of an underlying digital asset native units of the blockchain. The method comprises generating a first token transaction and transmitting the first token transaction to the blockchain network. The first token transaction comprises a first token output and the first token output comprises a first token locking script and a first token amount. The first token locking script comprises a variable component and a constant component. The variable component comprises a first payment address embedded in a payment template. The constant component comprises a token mechanics sub-component which, when executed alongside an input script of a spending transaction, the input script comprising all but itself of the spending transaction as well as a respective locking script and an amount locked in a previous transaction output that is being spent, the token mechanics sub-component is configured to perform the following operations. A first operation comprises obtaining one or more data pairs from the input script of the spending transaction, each data pair comprising i) at least a respective payment address included in a respective locking script of the spending transaction outputs and ii) a corresponding amount of the underlying digital asset locked by the respective locking script of that output. Another operation comprises verifying that one or more outputs of the spending transaction comprise a respective locking script that comprises a) a respective payment script template that includes a predetermined payment address, or b) a respective variable component comprising a respective payment address other than the predetermined payment address, followed by the constant component. Another operation comprises, for those one or more outputs of the spending transaction, verifying that a total amount of the underlying digital asset locked by the respective locking scripts of the one or more outputs is equal to the first token amount. The token mechanics sub-component is configured to fail during execution if any of verification steps fail.

Unlike previous token attempts, the newly issued tokens according to the present invention are the underlying digital asset tokens themselves. That is, the native tokens themselves are transformed into a new type of token. These new tokens no longer perform their regular function as the native token, unless converted back into the underlying digital asset under certain specified conditions encoded in themselves upon their issuance.

In order for a token to be spent, assigned, or otherwise transferred, and therefore function as a token, a spending transaction to be successful must have in its next output a locking script of the same format as a previous transaction output (called UTXO*), that is being spent. That is, like the token transaction output which is being spent, the spending transaction, in order to be able to be successfully transmitted, must include an output having a locking script that has the same constant component of the new token output. This constant part can neither be changed nor omitted through token's lifetime until its redemption.

This constant part is the token's code part, which among its various operations, in order to transform token's nature dictates from one transaction to another: 1) its self-immutability, 2) impossibility of its own omission, and 3) most importantly, preservation of tokens amount—that is, it locks the tokens, letting their amount (whole or a part) neither to be leaked as miners fees (in case total outputs amount is less than total inputs') nor spent to any other than its own smart locking script format outputs (unless redeemed to a specified address, encoded in itself upon issuance).

Simply put, it makes native tokens regular usage impossible while enforcing newly defined one, thus changing their nature.

This has the effect that each single unit of the underlying digital asset now represents a redefined single token and stops its regular functioning. To continue with the example of the bitcoin blockchain, a single satoshi is now redefined as a single token. The owner of the token(s) cannot move the token(s) to another user unless the locking script contains exactly the same constant component, which enforces new token mechanics. All that can be changed in the locking script is the variable component which may be a standard template (e.g. used in the same manner as in native tokens of underlying asset) responsible for transferring ownership, that is, enabling the current owner to move some or all of the token(s) to the next owner, according to an address included in such a standard template.

Put another way, unlike previous attempts that rely on metadata attachments to represent a token, according to this scheme the tokens of the present invention are single units of the underlying digital asset which have been reconfigured to function as distinct entities, operating by different rules (encoded in themselves).

As mentioned above, the tokens can be converted back into the underlying digital asset, i.e. to be used once again as the native token, if and only if the tokens are subject to satisfying particular conditions encoded in the above constant part of the script, e.g. a movement to predetermined redemption address. That is, only a hardcoded user or authority (i.e. the entity that has control over the redemption address) has the ability to turn the tokens back into the regular underlying digital asset's nature, restoring their original functioning.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
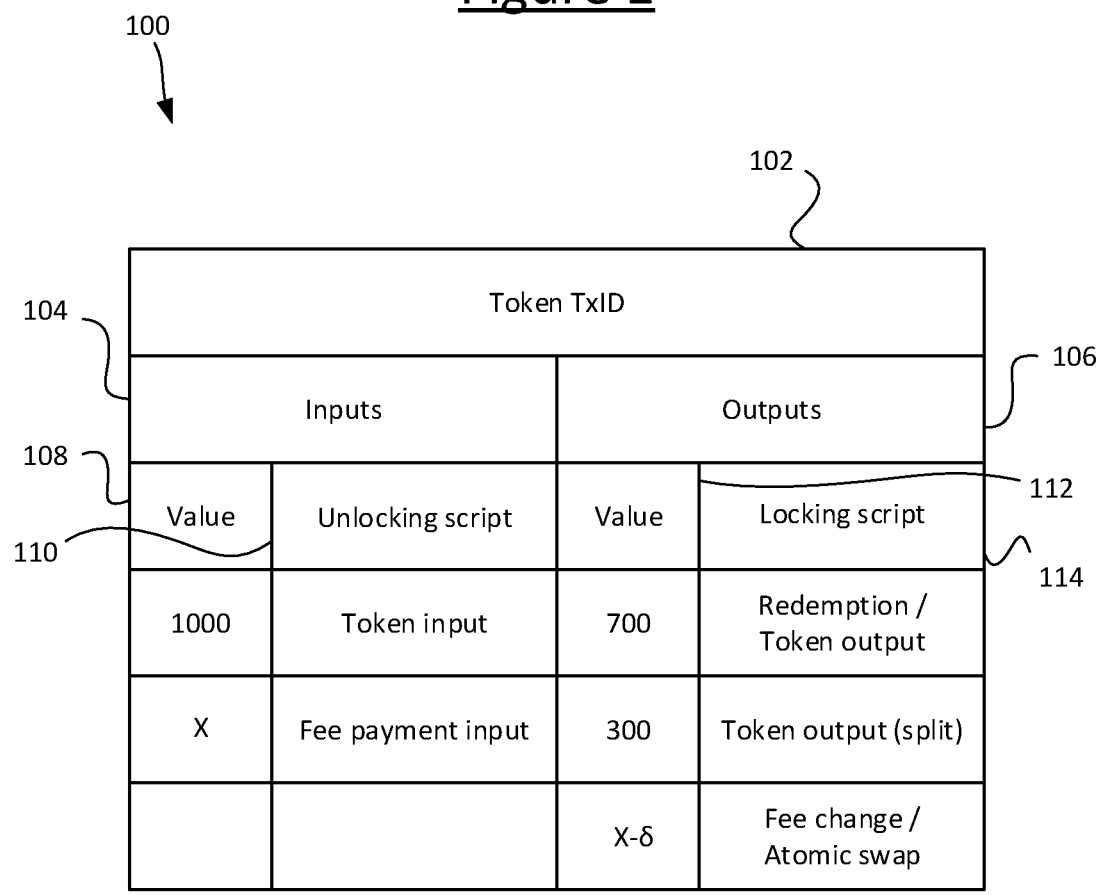
FIG. 1 schematically illustrates an example token transaction.

Embodiments of the present invention involve the creation and transmission of blockchain transactions. Whilst the skilled person will be familiar with blockchain technology per se, a brief overview of the blockchain is first provided before the embodiments themselves are described in detail.

A blockchain is a form of distributed database (or ledger) that acts as a record of all valid transactions that have ever been transmitted to the blockchain network.

Valid transactions that are broadcast on the blockchain network are recorded on the blockchain by miners (also referred to as mining nodes) in blocks. A blockchain transaction is used to transfer custody, i.e. ownership, of an amount of a digital asset. An example blockchain is the bitcoin blockchain, of which the digital asset is referred to as Bitcoin. There exist many different blockchains and the present invention is not limited to any particular implementation. Each transaction includes, amongst other things, at least one input and at least one output. An input is includes a reference to an unspent transaction output (UTXO) from a previous transaction. A transaction uses unspent transaction outputs (UTXOs) as inputs and distributes their value to new outputs. An output typically includes a locking condition that locks the value of that output, requiring certain data (e.g. a set of signatures or other information) to be provided in an input of a new next transaction in order to be unlocked. Outputs can also be used to inscribe data (e.g. text, images, etc.) onto the ledger. An input of a transaction usually includes a digital signature that signs over at least part of the transaction. A chain of transactions therefore includes a chain of digital signatures that maps out the entire history of valid exchanges of the digital asset all the way back to their creation.

The blockchain begins with a "genesis block", which is the first block ever created. Each block on the blockchain references a previous block, all the way back to the genesis block. That is, the $n^{th}$ block references the n–$1^{th}$ block, the n–$1^{th}$ block references the n–$2^{th}$ block, and so on, back to the genesis block.

A block contains an ordered list of blockchain transactions and a block header. The block header includes a Merkle root that is generated by hashing the ordered list of blockchain transactions into a Merkle tree, a timestamp, a reference to the previous block that the present block builds upon and the means to validate the "proof-of-work" needed for other miners to accept the block as valid. That validation means is an answer to a hash puzzle which is unique to each block. The blockchain protocol run by mining nodes of the blockchain network uses a hashing algorithm that requires those miners to pre-build their candidate block before trying to solve the puzzle. New blocks cannot be submitted to the network without the correct answer—the process of "mining" is essentially the process of competing to be the next to find the answer that "solves" the current block. The hash puzzle in each block is difficult to solve, but once a valid solution is found, it is very easy for the rest of the network to confirm that the solution is correct. There are multiple valid solutions for any given block—only one of the solutions needs to be found for the block to be solved.

The following briefly describes the process of attempting to mine a new block to the blockchain. When a blockchain transaction is transmitted to a mining node, it is first validated according to the consensus rules of the blockchain network. If the transaction is valid it is added to a pool of unconfirmed transactions. The pool is sometimes referred to as a "mempool". The mempool acts as a temporary store of transactions to be mined into the next block. Each mining node will have its own mempool, and any given transaction may be included in more than one mempool if it has been broadcasted to more than one mining node.

A miner takes the transactions it intends to include in the next block and hashes them into a Merkle tree structure and includes the resulting Merkle root within a candidate block header. The miner then hashes this candidate block header, attempting to find a valid proof-of-work. A Merkle tree is a data structure in the form of a tree of hash values. In the context of the blockchain, a transaction is hashed to form a leaf node of the tree. Pairs of leaf nodes are concatenated and then hashed to form a node in a higher layer of the tree. Pairs of nodes in that layer are then concatenated and hashed to form a node in a yet higher layer of the tree. The process is repeated until only a single node is left, referred to as the root node, or the Merkle root.

A hash function is a function that converts a string of data of arbitrary length into a fixed length unique (de-facto zero probability of collisions) value, called the hash value or a hash digest. Hashing is a one-way function, meaning it is infeasible to determine what the input data is by looking at the hash value produced from it. On the other hand, it is trivial to run the same input data through the same hash function and reproduce the same hash. Some blockchain protocols use the SHA-256 hashing algorithm, and some protocols use the SHA-256 hashing algorithm twice, i.e. the candidate block header is passed through the same hashing algorithm twice.

A valid proof-of-work if found by hashing the candidate block header (in combination with other data, as discussed below) until the result is less than another value, called the target value. The target value is automatically adjusted by the blockchain protocol so that, on average, it takes the blockchain network ten minutes to find a valid proof-of-work.

In order to change the hash value, a mining node must add additional information to the candidate block header. Mining nodes typically use two "nonce fields" to alter the value to be hashed, and thus alter the resulting hash value. A first nonce field is included in the block header itself, and the second nonce field is included in a "coinbase transaction". A coinbase transaction is a transaction created and included in the candidate block by the mining node. Each field includes a counter parameter that can be incremented. The hash function cycles through all values of the first nonce field then increments (or otherwise changes) the second nonce field, before going through all permutations of the first nonce field again. Incrementing the second nonce field involves recomputing the Merkle root as it modifies the hash of the coinbase transaction, which is included in the Merkle tree.

When a mining node finds a valid proof-of-work hash for a block (i.e. a candidate block header that hashes to a value less than the target value), it broadcasts the new block to the rest of the blockchain network. The other nodes on the network accept this new block only if all the transactions in it are valid and have not yet been included in a block. Every block is timestamped and references the hash of the block preceding it, thus resulting in a chain of blocks, hence the term "blockchain".

Blockchain transactions will now be described in more detail. The table below is a schematic representation of the structure of a typical transaction according to some blockchain protocols. It will be appreciated that different blockchain protocols may use different transaction structures. The following discussion is therefore provided only for context and is not intended to be limiting on all embodiments.

As shown, a transaction is made up of a set of data fields. In its raw form the transaction is made up of the serialised set of data fields which are typically represented in hexadecimal.

| Field | Size | Description |
| --- | --- | --- |
| Version | 4 bytes | Version of transaction data structure |
| Input Count | Variable | Indicates the number of inputs |

| Input(s) | Field | Size | Description |
| --- | --- | --- | --- |
| | TXID | 32 bytes | Reference to previous transaction |
| | VOUT | 4 bytes | Selects an output of previous transaction |
| | ScriptSigSize | Variable | Length of unlocking script |
| | ScriptSig | Variable | A script that unlocks the selected output |
| | Sequence | 4 bytes | |
| Output Count | Variable | | Indicates the number of outputs |

| Output(s) | Field | Size | Description |
| --- | --- | --- | --- |
| | Value | 8 bytes | The value of the output |
| | ScriptPubKeySize | Variable | Length of locking script |
| | ScriptPubKey | Variable | A script that locks the output |
| Locktime | 4 bytes | | Sets a minimum block height or Unix time from which this transaction can be recorded in a block |

A transaction has one or more inputs, each input referencing an output of a previous transaction. Each input may reference a different output of the same previous transaction, or outputs from different transactions, or a combination thereof. Each input includes an unlocking script (sometimes referred to as "ScriptSig") that, if includes the correct data, will unlock the referenced output. An unlocked output of a previous transaction, or rather the amount of the digital asset previously locked to that output, can then be spent by (i.e. assigned to) an output of the current transaction. The unlocked amount of the digital asset may be spent in its entirety by a single output, or it may be distributed across more than one output of the current transaction.

A transaction also has one or more outputs, which together distribute the total amount of the digital asset unlocked by the inputs. Normally the sum of the output values is less than the sum of the input values, with the difference being paid as a fee to the mining node that records the transaction in a new block. An output can either be a spendable output or an unspendable output. A spendable output includes a locking script (sometimes referred to as "ScriptPubKey") that defines one or more conditions that must be satisfied in order to be unlocked by an input of a later transaction. An unspendable output does not contain a locking script that can be unlocked. In other words, the unspendable output contains a locking script that will cause the execution of the locking script to fail.

Embodiments of the present invention enable a first party (call her "Alice") to send one or more tokens to a second party (call him "Bob"). At least some of the following description will refer to the first party, Alice, sending tokens to the second party, Bob. However it should be noted that this is for illustrative purposes only. The embodiments equally apply to the second party, Bob, sending tokens to a third party, e.g. a merchant. In addition, reference will also be made to the token issuer, i.e. the party that initially issues the token, e.g. to Alice. Also, at least some of the following description will refer to a "first token transaction". Unless the context requires otherwise, the first token transaction may be created by any of Alice, Bob or the token issuer.

Figure 4:
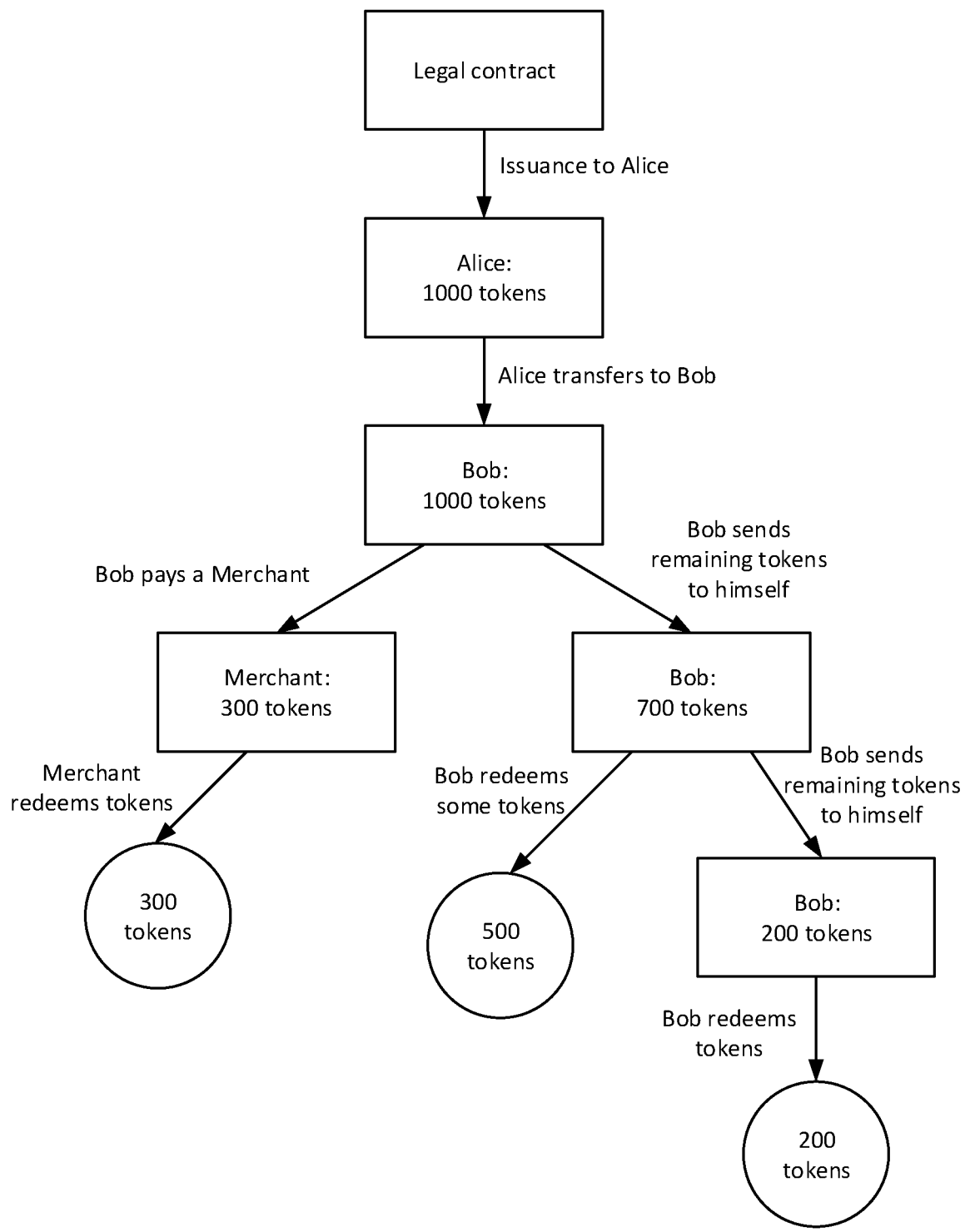

FIG. 4 illustrates an example system comprises several parties, e.g. token issuer, Alice, Bob, and a merchant. Whilst the term "party" may be used to refer to a user (e.g. Alice), a party may take other forms, e.g. a collective group of users such as a company or other form organisation. It is also not excluded that a party may be an autonomous entity, i.e. an entity that performs predetermined actions based on one or more conditions. Such an autonomous entity is sometimes referred to in the art as an "agent".

Whilst not showing in the figures, each party operates respective computer equipment. The computer equipment of each party comprises respective processing apparatus comprising one or more processors, e.g. one or more CPUs, GPUs, other accelerator processors, application specific processors, and/or FPGAs. The computer equipment of each party further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment of each party stores software comprising a respective instance of at least one client application arranged to run on the processing apparatus. It will be understood that any action attributed herein to a given party may be performed using the software run on the processing apparatus of the respective computer equipment. The computer equipment of each party comprises at least one user terminal, e.g. a desktop or laptop computer, a tablet, a smartphone, or a wearable device such as a smartwatch. The computer equipment of a given party may also comprise one or more other networked resources, such as cloud computing resources accessed via the user terminal.

The client application may be initially provided to the computer equipment of any given party on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The token issuer is the party that issues the token(s) to an initial recipient, e.g. Alice. The token(s) may be issued to Alice using an initial token transaction generated by the token issuer, or Alice herself may generate the initial token transaction. For instance, the token issuer and Alice may agree on a number of tokens to be issued to Alice (and any other applicable contract conditions), and then Alice can effectively issue the tokens to herself by moving one or more tokens to a different party, e.g. Bob.

Alice (or the token issuer) generates the initial token transaction. The token transaction comprises one or more inputs and one or more outputs. If required, one of the inputs may be used as a fee payment for paying a transaction fee to a mining node for recoding the token transaction in a block. Transaction fees are not always required and therefore such a fee payment is not essential. Like all blockchain transactions, the token transaction includes an input for unlocking an output of a previous transaction. For the initial token transaction, the referenced output of the previous transaction must include, at a minimum, an amount of the underlying asset that will be reconfigured as tokens. As shown in FIG. 4, the initial token amount is 1000, and so the referenced output must have a value of at least 1000 units of the underlying asset. It will be appreciated that this number has been chosen arbitrarily, and in general any number may be used as the initial token amount. For brevity, the units of the underlying asset will be referred to as satoshis. Whilst this is the particular unit of the bitcoin blockchain, this is in no way limiting to all embodiments.

The initial token transaction comprises a first token output. The first token output locks the initial token amount (1000 Satoshis). That is, the first token output comprises a first token locking script that locks the initial satoshis amount into identical amount of newly defined tokens. The first token locking script comprises a variable component and a constant component. Put another way, the variable component is one section (i.e. part) of the first token locking script, and the constant component is a different section (i.e. part) of the first token locking script. As their names imply, the variable component may vary between token transactions, whereas the constant component will remain the same.

The variable component is the part of the token locking script that allows tokens to be moved to another party. The variable component includes payment template containing (e.g. surrounding) a payment address. The payment address may be based on a public key of a recipient party. For instance, the payment address may be a public key hash (PKH) address, i.e. a hash (or double-hash) of a public key. If the initial token transaction is generated by the token issuer, the payment address will be linked to Alice. If Alice generates the initial token transaction, the payment address will be chosen by Alice. Alice may choose another address linked to herself, or she may choose an address linked to a different party, e.g. Bob or a merchant. The payment address may be treated as a sub-component of the variable component. The variable component may comprise one or more additional constant sub-components. For instance, the variable component may comprise one or more constant opcodes for creating a pay-to-public-key-hash (P2PKH) format output.

The constant component comprises a token mechanics sub-component, shortened to below as "token sub-component", which is a constant sub-component of the constant component.

The token sub-component is the part of the first token locking script that repurposes the underlying digital asset as tokens. E.g. turning the 1000 satoshis into 1000 tokens. The token sub-component is configured to obtain data from an input of a spending transaction and perform at least two verification steps. Furthermore, the token sub-component is configured to cause the execution of the token locking script to fail if the verification fails. I.e. the execution of the token locking script together with an unlocking script from the input of the spending transaction will fail if either of the verification steps fails.

The token sub-component requires an input (specifically the unlocking script of the input) of a spending transaction to comprise certain data in order to validly execute. The input of the spending transaction will be referred to as a spending input. In particular, the unlocking script of the spending input must include at least some of the spending transaction, i.e. the spending transaction data (some parts as is, while only hashing results of the others) other than the unlocking script itself. From now on this data is called hash preimage (since its hash serves as input in ECDSA verification formula), or just a preimage. The preimage includes fields of the spending transaction as well as the one being spent, and data items generated (hashed) based on these transactions fields. In other embodiments, all of the data fields of the spending transaction are included in the unlocking script of the spending input verbatim.

The token sub-component is configured, when executed, to obtain from the unlocking script of the spending input, in addition to preimage, one or more data pairs. Each data pair includes at least a payment address of a locking script of the spending transaction, and a corresponding amount of the underlying digital asset locked by that locking script. In some examples, the spending transaction only contains one output, i.e. one locking script. In that case the token sub-component obtains one data pair. In other examples the spending transaction contains multiple outputs, i.e. multiple locking scripts. In that case the token sub-component obtains multiple data pairs.

The required data may be obtained by parsing the unlocking script of the spending input and extracting the data pairs. This may require the data pairs to be included in the unlocking script at predefined locations. A more detailed discussion is provided below.

Having obtained the one or more data pairs, the token sub-component is configured to verify that the output(s) of the spending transaction have a particular format. At least one output of the spending transaction must include either a predetermined payment address, as part of a predetermined standard payment template only, or an arbitrary address, as part of a predetermined standard payment template as well, but also followed by the constant component of the token output (i.e. the same, identical constant component). The token sub-component may determine and verify that more than one output of the spending transaction includes an arbitrary payment address, embedded in predetermined standard payment template, followed by the constant component of the token output. The spending transaction may verify that the spending transaction includes one or more outputs that do not contain the predetermined payment address (with its corresponding standard template only) or an arbitrary payment address, with its corresponding standard template, followed by the constant component of the token output.

The token sub-component is also configured to verify that together, the sum of values locked by the outputs of the spending transaction that contain either the predetermined payment address or the arbitrary payment address followed by the constant component, is equal to (i.e. identical to) the initial token amount. An output of the spending transaction that contains either the predetermined payment address or the constant component may be referred to as a smart token output. The token sub-component verifies that the total amount of tokens locked by the smart token outputs is equal to the initial token amount, thus preventing their leakage back to their original or any other usage formats.

For instance, consider the case where the spending transaction comprises a single smart token output—the first output of the spending transaction. The token sub-component is configured to verify that the first output of the spending transaction has a first locking script taking a particular format, or rather containing particular data. Specifically, the first locking script must contain either a predetermined payment address (as part of a payment template) or an arbitrary payment address (as part of a payment template) followed by the constant part of the token locking script. Only one of the two are required, but if both are missing then the verification will fail. This verification process is achievable because the token sub-component has obtained the first locking script of the spending transaction from the unlocking script of the spending input. Therefore the token sub-component can search the first locking script for the predetermined payment address or the constant component.

The spending transaction may contain multiple outputs, as discussed above. Some of the additional outputs may also be smart token outputs, or they can be used for different purposes. In this case the token sub-component is configured to verify that more than one output of the spending transaction contains either the predetermined payment address or an arbitrary payment address followed by the constant component of the token transaction, i.e. the constant component of the token locking script. Depending on implementation, the token sub-component may be configured to verify that each and every one of the multiple outputs of the spending transaction includes the predetermined payment address or the constant component. In other examples, the token sub-component may be configured to verify that some but not all of the multiple outputs contain the predetermined payment address or the constant component. For instance, the token sub-component may verify that a predetermined number of the outputs of the spending transaction contain the constant component, e.g. the first two outputs—that is, the two outputs that appear logically first in the spending transaction.

In the examples where the spending transaction includes a single smart token output, the token sub-component is configured to verify that the first amount of the underlying digital asset locked by the first locking script of the spending transaction is equal to the initial token amount (i.e. 1000 Satoshis). Here, the first output having the first locking script is the output that appears logically first in the spending transaction.

If the spending transaction includes multiple outputs, e.g. a second output having a second locking script locking a second amount of the digital asset, the token sub-component is configured to verify that a sum of the first amount and second amount is equal to the initial token amount. Here, the second output is the output that appears logically second in the spending transaction. In general, if the spending transaction includes multiple outputs that contain either the predetermined payment address or the constant component, then the token sub-component verifies that a sum of their respective amounts is equal to the initial token amount.

This process may be repeated for any number of outputs of the spending transaction. The spending transaction may be allowed to include an output that locks an amount of the digital asset which would result in a sum of the digital asset locked by all of the outputs of the spending transaction being greater than the initial token amount. In this case, the token sub-component is configured to verify that, together, a predetermined number of smart token outputs of the spending transaction lock an amount of the digital asset that is equal to the initial token amount, and the amount locked by non-smart token outputs are not taken into account. A non-smart token output may be a fee change output, or an atomic swap output. For instance, the total amount locked by the first two outputs of the token transaction must be equal to the initial token amount, whereas a third output (e.g. a fee change output) may lock an additional amount, which is funded by an additional input. Note that the third output is used for illustrative purposes. Fee change outputs are discussed more below. For now it will suffice to say that this is only allowed if the fee change output (or a different type of "additional output") is not a token output, i.e. does not contain the constant component of the token locking script.

The constant component of the token locking script may contain the predetermined payment address. That is, the predetermined payment address may be hardcoded into the constant component, and thus must be included in the first locking script of the spending transaction. The predetermined payment address may be a redemption address, e.g. an address which some or all of the tokens may be moved to in order to be redeemed for something other than the tokens, e.g. FIAT currency.

As discussed above, the unlocking script of the spending input of the spending transaction may include a preimage. The preimage may comprise one, some or all of the fields in the table below.

| Preimage Field | Size |
| --- | --- |
| nVersion of the transaction | 4 byte little endian |
| hash Prevouts | 32 bytes |
| hashSequence | 32 bytes |
| Outpoint | 32 byte hash + 4 byte little endian |
| scriptCode of the input (Serialized as scripts inside CTxOuts) | Variable |
| value of the output spent by the input | 8 byte little endian |
| nSequence of the input | 4 byte little endian |
| hashOutputs | 32 byte hash |
| nLocktime of the transaction | 4 byte little endian |
| sighash type of the signature | 4 byte little endian |

Note that this particular structure of the preimage is included for illustrative purposes, and other structures may be used, e.g. the size of the data fields may differ depending on the particular blockchain being used to implement the present invention.

In these examples, token sub-component may be configured to obtain the token locking script of the initial token transaction (i.e. scriptCode of the input) and the initial token amount (i.e. value of the output spent by the input) by extracting them from the preimage. Since the size of all the data fields of the preimage except for the scriptCode is known, the token sub-component can extract the required fields by parsing and extracting the data at predetermined positions.

As shown in the table above, the preimage may comprise a hash of the outputs of the spending transaction (hashOutputs). This is a hash of each output, i.e. the value locked by the locking script, and the locking script itself. So if the spending transaction contains a single output, hashOutputs contains a hash of one value concatenated with one locking script. If the spending transaction contains two outputs, each value-locking script pair is concatenated and then hashed to form hashOutputs. The token sub-component may extract hashOutputs from the preimage, e.g. by parsing and extracting the data at a particular position.

The unlocking script of the spending transaction contains the one or more data pairs, as discussed above. Recall that each data pair includes a value and a locking script. The token sub-component may be configured to generate its own version of hashOutputs, i.e. generate a hash of the one or more data pairs, and then verify that the generated hash is equal to the hash (i.e. hashOutputs) extracted from the preimage. This may be done to confirm that the spending user, e.g. Alice or Bob, has included the correct data pairs in the unlocking script of the spending transaction.

In some examples, the token sub-component may be configured to verify that the preimage included in the unlocking script of the spending transaction has been generated correctly, i.e. that the data fields of the preimage correspond to the actual data fields of the spending transaction. This is necessary if the users of the system cannot be assumed to be trusted to generate spending transactions correctly. To do this, the token sub-component generates its own version of an expected preimage of the spending transaction, e.g. one containing all of the data fields in the table above. The token sub-component can then verify that the preimage extracted from the unlocking script of the spending transaction matches the preimage generated by the token sub-component.

One way of verifying that the preimage included in the unlocking script of the spending transaction has been correctly is using a pseudo-opcode known in the art as OP_PUSH_TX. However any equivalent opcode, or more generally, any equivalent code that performs a function equivalent to OP_PUSH_TX may be used instead.

In general, the token sub-component may be configured to generate a digital signature (e.g. an ECDSA signature) using the preimage from the unlocking script and a private key. The private key is included in the unlocking script of the spending transaction. Then, the token sub-component verifies that the digital signature is a valid signature when validated against the generated preimage (i.e. the preimage generated by the token sub-component) and a public key corresponding to the private key. The public key is also included in the unlocking script of the spending transaction. The digital signature will only be valid if the two preimages are an exact match. Since the private key used will be made public by virtue of being recorded on the blockchain, a "dummy" private key should be used, i.e. one which does not compromise the security of other data or blockchain transactions when revealed. However in general any private key can be used, e.g. any random key. This signature check can be performed by utilizing the OP_CHECKSIG opcode to verify the signature. OP_CHECKSIG is an opcode that only succeeds (i.e. successfully executes) if the signature is for the current transaction, i.e. the spending transaction in this case.

Returning to the outputs of the spending transaction, the token sub-component may be configured to verify that the output(s) of the spending transaction (specifically their respective locking scripts) contain a respective payment address of a predetermined type, i.e. format. Preferably, the respective payment addresses must be of the same type as the payment address included in the variable component of token transaction. More preferably, the payment address must be of a PKH address. This may be verified based solely on the payment address itself, or it may be verified based on the payment address and one or more additional data items, e.g. one or more opcodes or other data either side of the payment address. For instance, a P2PKH output includes certain additional data that may be checked for in the output.

The token sub-component of the constant component has been discussed above. The constant component may also comprise a constant data sub-component (shortened to "data sub-component" below). In general the data sub-component may contain any data that is to be stored in each token output. For instance, the data sub-component may comprise a token protocol identifier, e.g. a flag indicating that the tokens are of a particular protocol. E.g. to indicate that the tokens represent FIAT currency. Additionally or alternatively, the data sub-component may include a transaction identifier (TxID) of a transaction (called a "token issuance transaction") that is recorded on the blockchain. Similarly, the token issuance transaction may in general contain any data. E.g. a token issuance contract issued by the token issuer, and/or the initial token amount. The data sub-component may be included after an OP_RETURN opcode, or code that performs the equivalent function.

The above description primarily relates to an initial token transaction and a spending transaction. The following will now describe in more detail the spending transaction, which itself is a token transaction. The spending transaction will be referred to as a "first token transaction", so as to allow the term "spending transaction" to be reserved for a later transaction that references an output of the first token transaction.

The first token transaction will be described with reference to FIG. 1. As shown in FIG. 1, the first token transaction 100 comprises a transaction identifier (Token TxID), one or more inputs 104 and one or more outputs 106. Each input 104 comprises an input value 108 and an unlocking script 110. Note that FIG. 1 is a schematic representation. The inputs 104 do not themselves contain an input value 108. Rather, the inputs 104 contain a pointer (e.g. TXID and VOUT) to an unspent transaction output (UTXO) of a previous output, with that previous output locking a value 108, which is now referred to as an input value 108. However the value 108 unlocked by a respective unlocking script 110 is shown for illustrative purposes. Each output 106 comprises an output value 112 and a locking script 114.

Figure 2:
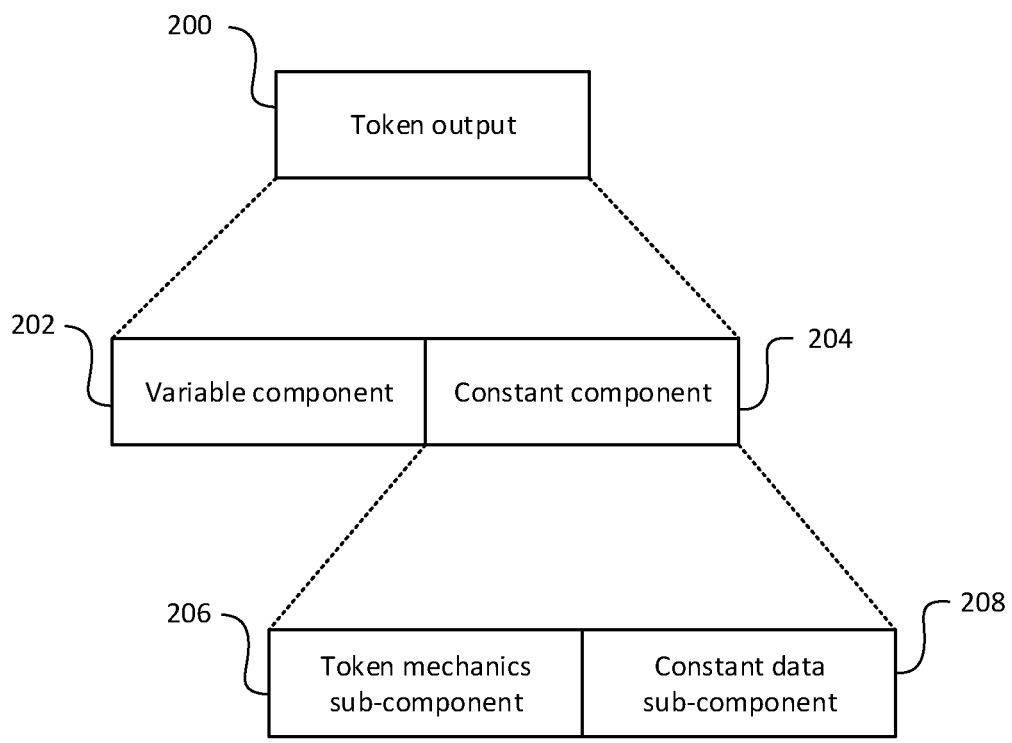
FIG. 2 schematically illustrates an example token locking script.

The outputs 106 of the first token transaction 100 will be described first since they have already been described above with reference to the spending transaction. The token transaction 100 includes at least a first token output ("redemption/token output"). The first token output is illustrated in FIG. 2. As shown in FIG. 2 and as already described above, the first token output 200 contains a variable component 202 and a constant component 204. The constant component 204 contains a token mechanics sub-component 206, and in this example, a constant data sub-component 208.

The variable component 202 contains a respective payment address of a party to which the first token amount (e.g. 700 tokens) is being assigned to. The token sub-component 206 is configured to perform some or all of the verification steps described above. For instance, the token sub-component 206 is configured to verify that the total amount of digital asset to be locked by a predetermined number (e.g. one or two) outputs of the spending transaction is equal to the first token amount (700 tokens). The token sub-component 206 of the first token output 200 is also configured to verify that an input of a later spending transaction attempting to unlock the first token output 200 comprises outputs with either regular payment template including the redemption payment address or the whole format of the first token output 200 that comprises the variable component 202 and the constant component 204. In general, the token sub-component 206 may be configured to perform any of the verification techniques previously described.

The first token transaction 100 may also contain a second token output. The second token output also contains a respective variable component and a respective constant component. The variable component of the second token output may contain a different payment address compared to the variable component 202 of the first token output 200. The token sub-component of the second token output is configured to perform the same verification steps as the token sub-component 206 of the first token output 200, except that now the verification is of a different spending transaction, i.e. the one having an input referencing the second token output. In other words, the first token transaction 100 can have more than one output, and each of those outputs can be spent (unlocked) by a different spending transaction. For instance, the token sub-component of the second token output is configured to verify that the total amount of digital asset locked by a predetermined number (e.g. one or two) of outputs of the spending transaction is equal to the second token amount (300).

The first token transaction 100 may contain any number of token outputs, so long as sum of their respective token amounts exactly equals to the value (1000 tokens) locked in the first token output (referenced by TXID field in transaction's input), it is attempting to spend.

The first token transaction 100 may contain a fee change output. This output allows the fee change (X−δ) to be returned to a fee change payment address. In the example of FIG. 1, a fee payment input having an input value (X) is used to pay a transaction fee (δ).

Additionally or alternatively, the first token transaction 100 may contain an atomic swap output. The atomic swap output will be described below.

In the example of FIG. 1, the first token transaction 100 comprises a token input. The token input is equivalent to the spending input described in detail above. More specifically, the token input references a token output of a previous token transaction, e.g. the initial token transaction. In this example, the referenced token output locks 1000 tokens. The token input includes all but itself of the first token transaction, including a respective data pair for each output 106 of the first token transaction 200. That is, in this example, the token input comprises three values (700, 300, X−δ) and three corresponding payment addresses, one from each of the token's locking scripts ("redemption/token output", "token output (split)", "fee change/atomic swap"). The values 112 and payment addresses may be paired such that the first token amount (700) is followed by the payment address from the first token output locking script, following by the second token amount (300), and corresponding payment address from the second output locking script and so on. The token input also includes a signature for unlocking the referenced token output. I.e. a signature corresponding to the payment address included in the variable component of the referenced token output. If Alice is moving the tokens, Alice's signature is included in the input of spending transaction. In some examples, instead of just a payment address, the whole locking script can be included in the input (i.e. as part of a data pair).

As shown in FIG. 1, the first token transaction 100 includes a fee payment input. The fee payment input references an output of a distinct previous regular non-token transaction output and includes a fee that is paid to a mining node for including the first token transaction 100 in a block. The fee payment input comprises at least one digital signature, depending on the requirements of the output that it references. In some examples, the digital signature is generated by the owner of the token output referenced by the token input of the first token transaction 100. For instance, if Alice is sending 700 of the 1000 tokens to Bob, and 300 of the tokens to a merchant, Alice may fund the transaction. In that case Alice's signature is included in the fee payment input. However it is not excluded that a different party, e.g. Bob, may fund the transaction by unlocking a UTXO locked to Bob. In this case Bob's signature is included in the fee payment input. The atomic swap output was mentioned above, in case of which the miner fee payment input has additional task of the payment (for tokens) In this example, Bob funds the transaction by including his signature in the fee/"tokens purchase" input, and the "fee change"/"atomic swap" output is locked to Bob. That is, the "fee change"/ "atomic swap" output comprises a payment address linked to Bob, e.g. a hash of a public key owned by Bob.

To enforce the atomic swap, Alice creates the complete transaction except for the fee/"tokens purchase" payment input. Bob then creates and adds the fee/"tokens purchase" payment input. One way of doing this is for Alice to sign her input (i.e. the token input) and two corresponding outputs with a sighash flag (e.g. ALL|ANYONECANPAY) that allows another party to add an input. Bob then adds an input with a different sighash flag (e.g. ALL—sealing the whole transaction, not allowing any further additions to it).

Figure 3A:
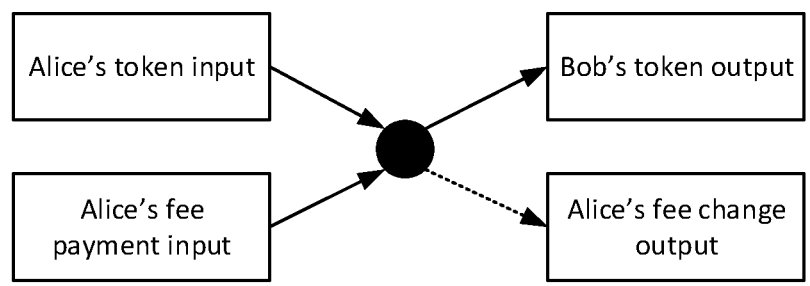
FIGS. 3A and 3B schematically illustrate the difference between a regular token transaction and an atomic swap token transaction, and FIG. 4 schematically illustrates an example flow of tokens from issuance to redemption.
Figure 3B:
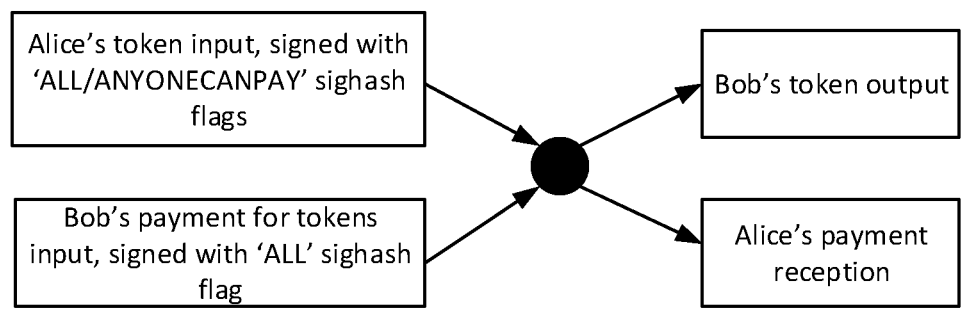

FIGS. 3A and 3B illustrate the concept of an atomic swap in more detail. Solid arrows indicate mandatory inputs and outputs, and dashed-arrows indicate optional inputs and outputs. Inputs to the transaction are shown on the left-hand side of the Figures, with outputs of the transaction being shown on the right-hand side. FIG. 3A schematically illustrates a transaction similar to that of FIG. 1. This example token transaction includes a token input generated by Alice that unlocks a token output of a previous token transaction, along with a fee payment input for funding the transaction fee (the fee taken by a mining node for recording the transaction in a block). The token transaction also comprises a token output sent to Bob locked to his address included in the token format as in 200, along with a fee change output paying the change to Alice locking it to her address in regular payment format (the change specified in its output being the difference between the fee input payment and the transaction fee).

FIG. 3B illustrates an example of an atomic swap transaction. Bob's token output is generated in the same way as that of FIG. 3A. Alice again generates a token input for unlocking a token output of a previous token transaction, but this time she signs the transaction with an 'ALL/ANYONECANPAY' sighash flag. This means that Alice's signature signs all of the outputs but only this one input, i.e. the input spending token output signed with this sighash flags. The rest of the inputs are excluded. This sighash flag allows anyone to add or remove other inputs, so anyone can add funds to the transaction but cannot change their destinations and amounts. This allows Bob to add only his payment input, which will include miners fee as well. Bob includes a signature and signs with an 'ALL' sighash flag. This means that Bob's signature signs all inputs and outputs, protecting all elements from any further possible modification. In this example the second output is paid to Alice from this added by Bob input. This has the effect enforcing an atomic swap, whereby the token is sent to Bob if and only if Bob pays Alice for the token. If Bob is not satisfied with any component of the transaction, he simply does not provide a signature and therefore the token is not moved to his address and Alice does not get paid. Similarly, since Bob cannot modify the inputs and outputs created and signed by Alice, Alice can be sure that Bob can only receive the token if the payment conditions set by Alice are met.

FIG. 4 illustrates an example flow of tokens from issuance to redemption. The flow generally goes from top to bottom. As an optional first step, a legal contract is drawn up between a token issuer and an initial receiver, Alice. The contract may stipulate the terms and conditions of the token, including how they are to be redeemed, and an initial token amount (e.g. 1000). Then, the token issuer may create an initial token transaction and send the tokens to Alice. Alternatively Alice may create the initial token transaction and send some or all of them to another user, e.g. Bob, or even to herself. In FIG. 4, Alice sends all of the tokens to Bob, i.e. all of the tokens are assigned to a single token output sent to Bob's payment address. Bob then creates a token transaction with two token outputs. A first token output sends 300 tokens to a merchant's payment address. A second token output sends 700 tokens to Bob's payment address, which may be a different payment address of Bob's. The merchant then redeems its 300 tokens, i.e. by sending the tokens to the redemption payment address. Bob then also initially redeems 500 tokens, whilst sending the remaining 200 tokens to another payment address linked to Bob. Finally, Bob redeems the 200 tokens. Note that in each transaction the amount of incoming tokens matches the amount of outgoing tokens.

Embodiments of the present invention have been described generally above. A specific implementation of the invention will now be described. This particular example is mainly described in terms of the tokens representing fiat currency, i.e. the tokens are fiat-pegged tokens. However this is just one of many possible use cases of the invention. Moreover, this example is intended to be implemented using the Bitcoin blockchain. However in general any output-based (e.g. UTXO-based) blockchain may be used, of which the Bitcoin blockchain is one particular example.

According to this example, tokens are represented using Bitcoin, or more specifically the fundamental units of Bitcoin, called Satoshis, or satoshi units. A token output may include a single Satoshi representing a single token (e.g. a utility token for events, cinema tickets, bus tickets, etc.). This token is thus indivisible and cannot be split during its life cycle. Or, a token output may include multiple Satoshis representing an envelope of multiple tokens (e.g. USD-pegged tokens were one token represents 1 USD cent).

A token output includes a variable part and a constant part. The variable part is identical to a regular Bitcoin payment template that passes on possession of Bitcoins (i.e. Satoshis) through ECDSA usage. The constant part can neither be changed nor omitted throughout the time of the token's life.

Each Satoshi now represents a token and stops its regular functioning, regardless of the fact that it can represent something cheaper or more expensive than one Satoshi itself. Alice cannot move the any of the tokens to Bob unless she keeps this exact template as a locking script in her next token transaction. Only the possession address in the variable part can be changed.

Note that this is not the same as previous token attempts that use meta-data to interpret an output as a token output. The present invention fundamentally changes the mechanics of Satoshis with regards to their regular use as Bitcoin.

The variable part is intentionally at the very beginning of the token locking script and is just a regular payment template, e.g. a P2PKH template. This provides maximum compatibility with existing blockchain client applications and browsers, and enables the payment address (wrapped in the template) to be searched and located in the manner it is done today.

The token mechanics part enforces at least three conditions. First, token spending is only possible if the next UTXO has exactly the same locking script as the UTXO being spent, apart from the new possession address. Secondly, spending by a transaction with a regular bitcoin locking script template (e.g. P2PKH, P2PK, etc.) fails unless it is a P2PKH that includes predetermined redemption payment address. The predetermined redemption payment address is included in the contract issued to Alice and is hardcoded into the token locking script. If the token issuer sets the redemption address to an address linked to itself, this means that only the issuer has an ability to turn asset-representing Satoshis back into their original regular use as Satoshis, e.g. by releasing the represented asset such as USD, gold, etc. This makes the tokens permissionless. Thirdly, when moving tokens, the amount of Satoshis in a token output of a current unspent token output (UTXO), must be either exactly the same as the amount of Satoshis in a token output of a spending transaction (e.g. redemption or next token transaction), or split into two or more sets of tokens, sum of amounts of which must be equal to UTXO's original amount. E.g. the tokens can be split into two outputs of the spending transaction, with the locking scripts of the two outputs being identical (except for the variable parts' addresses) to UTXO's locking script that is being spent.

The state pushed through in these stateful transactions is the possession address updated each hop and (only in the case of an envelope of tokens) the amount of tokens, which may be reduced through splitting.

The constant data part has two fields. One field contains the token protocol identifier, e.g. a token protocol flag for a fiat-pegged token. The identifier is used to specify the token type. A second field is a pointer (TxID) to special transaction, which carries in it: a) an initial issuance contract (e.g. between the issuing entity and the client) with all its legal terms, conditions, licenses and any other necessary information related to the tokens attributes and issuance; and b) the exact Satoshi balance predetermined to be transformed into tokens in subsequent transaction (which will be the issuance transaction) with a token output.

The constant data fields are put behind OP_RETURN opcode to be just a data attachment avoiding attempts of execution as part of the script code during script evaluation. That is, the constant data is preferably included at the end of the locking script and immediately after the OP_RETURN opcode for maximum compatibility for apps and browsers performing searches on OP_RETURN transactions.

With regards to the transaction structure itself, the outputs of the token transaction may take one of the following three types: i) a regular output for redemption, ii) a token output, or iii) a regular output used for fee change, atomic swap, etc.

As an example, Alice may request a legal authorised entity to issue on her behalf 1000 tokens and provides the entity with her payment address. The entity creates an agreement in the form of a spendable transaction with pre-allocated amount of Satoshis in it corresponding to the requested amount (1000 in this case). The terms, conditions and license of the agreement state Alice's required actions (e.g. transfer corresponding amount of fiat money to the entity) and are signed by the entity, e.g. with ALL|ANYON-ECANPAY flags, to allow Alice to add her signature. Once Alice signs and publishes the agreement to the blockchain and performs the stated required actions (transfers fiat amount), the entity issues the token, on her behalf, to her payment address. Alice can now use/spend/transfer all of the tokens at once or part of the tokens. The subsequent possessors can redeem the tokens at will, hence the tokens being permission-less.

Returning to the constant part of the token output, the constant part roughly comprises two parts. The first part implements OP_PUSH_TX and is responsible for accessing the current transaction's fields inside script execution. The second part is the tokens logics.

The sighash preimage has been described above. OP_PUSH_TX performs ECDSA signing of the preimage corresponding to the current transaction, i.e. the spending transaction unlocking the token output, which has been pushed into the unlocking script to be accessed inside executed script. OP_PUSH_TX eventually calls OP_CHECKSIG for verification of the signature. This internal ECDSA signing is performed with arbitrary private-public key pairs (one ephemeral pair, one constant pair) which are publicly accessible, and so they should be unrelated to those used for token possession relay. Also, OP_CHECKSIG in this case functions as a validator, since when called it constructs its own preimage for ECDSA verification from actual previous and current transaction fields. Hence it will fail or succeed depending on the actual fields being identical (or not) to those pushed into the unlocking script.

The tokens logic turns Bitcoin Satoshis into tokens. To do this the code requires access to the Satoshi value (amount) of the previous transaction (i.e. unspent output of which is containing the tokens) and the Satoshi value of the current transaction (i.e. the spending transaction) in order to control Satoshi spending. The code also requires access to the previous and current locking scripts to control the format of the output locking script.

Once the preimage pushed into the unlocking script of the current (spending) transaction is validated to be identical to the actual current transaction preimage, it is parsed for extraction of all the relevant fields, which include script-Code and value of the output spent by this input, and hashOutputs. Whilst the locking script and the values (i.e. amounts) of the previous UTXO (i.e. the one being spent) are provided in the preimage as they are, only the result of hashing of all the newly created outputs' locking scripts (combined with their new values) is available. Thus these new outputs' locking scripts and their corresponding values should be placed next to the preimage in the unlocking script of the spending transaction to be validated next against the hashOutputs field of the preimage that was previously proved to be identical to the one that OP_CHECKSIG constructs, when called.

Once all of the locking scripts and their values (i.e. amounts) for the transactions previous and next outputs are accessible by the code being executed, it is then possible to enforce the token rules.

The following example rules may be enforced. It will be appreciated that other additional or alternative rules may be implemented depending on the particular use case. In this example the following are allowed:

1. Redemption function—used to define a hardcoded address that may change the nature of the tokens back to Satoshis' native one, i.e. the underlying digital asset.
2. Splitting the amount of tokens at most into two possible outputs.
3. A third optional output which has a P2PKH format for receiving change from a miners fee payment, done with additional input or in case of "atomic swap" for receiving money by the token seller.

Stated more specifically, the rules are:
1. The first output of the token transaction is to be used only for:
   a) Redemption—standard P2PKH template, including mandatory hardcoded redemption address, or
   b) Token relay—smart token locking script identical to the previous output format.
2. The second output is optional for the case of token splitting and us only to be of the smart token type. In addition:
   a) If it exists, a sum of its output amount and the first output's amount must be equal to the amount in the UTXO being spent, b) Otherwise, the first output's amount must be equal to the amount in the UTXO being spent.

3. The third output is to be a standard P2PKH template only (the address is arbitrary). If it exists, it is used for change of the payment (i.e. done with additional input) for token operations.

Note that a P2PKH template is a transaction output script, which in its hex form is: "0x76a914+PKH+0x88ac", when pushing into an unlocking script preceding by Variant (designating length of the following script) 0x19 due its 25 bytes length. PKH is the public key hash address.

An example pseudocode for enforcing these rules is now provided.

```
redemption_PKH = 25daa25932d355826ce60881978f79621f1dfcd9 //
pushed into stack
before function code
function token (sighashPreimage, amountOne, PKH_One, amountTwo,
PKH_Two, amountChange, PKH_Change) {
  // validate the preimage is correct
  assert ( validate( sighashPreimage ) );
  // parse the preimage
  len = sizeof( sighashPreimage );
  // since script size range is known, VarInt has '0xfd' prefix followed by
two bytes with size value
  // skip '0xfd' prefix to the actual script length
  VarInt = sighashPreimage[ 105:107];
  // scriptCode is a locking script of previous output
  scriptCode = sighashPreimage[ 107: 107+VarInt ];
  value = sighashPreimage[ len − 52 : len − 44 ];
  hashOutputs = sighashPreimage [ len − 40 : len − 8 ];
  First Script;
  // first output script maty be either P2PKH (redemption case) or exactly
the same script as in the previous TX apart from the PKH address
  if( PKH_One != redemption_PKH ){
    // read from scriptCode the constant part that follows new address
(after: "76a914" + PKH)
    // reconstruct the whole script with data parts, substituting only new
possessor address
    // 23 is the length of the first 3 opcodes and the address
    FirstScript = concatenate( VarInt, "76a914", PKH_One, scriptCode[
23: ]);
  }
  else {
    //redemption may be part of a split, but must be first output
    // remainder is "88ac";
    FirstScript = concatenate("1976a914", PKH_One, "88ac"); // in case
of P2pKH VarInt is 0x19
  }
  NextScripts = concatenate( amountOne, FirstScript );
  // second optional output for splitting tokens case (if present, it may
only be smart token output)
  // allow to split to tokens with no value (0) − may be used for proves
  if ( PKH_Two ){
    NextScripts = concatenate (NextScripts, amountTwo, VarInt,
"76a914",
PKH_Two,
      scriptCode[ 23 : ] );
    assert( value == ( amountOne + amountTwo ) );
  }
  else {
    assert( value == amountOne );
  }
  // third optional output for a change of TX payment (of present, manda-
tory
P2PKH format)
  if ( PKH_Change ){
    // 0x19 prefix added − it is VarInt of P2PKH (25)
    NextScripts == concatenate( NextScripts, amountChange,
"1976a914", PKH_Change, "88ac" );
  }
  // finally validate concatenation of all new outputs' locking scripts and
amounts
  assert ( hashOutputs == sha256( sha256( NextScripts ) ) );
}
```

The following code illustrates an actual example implementation in Bitcoin Script language. For this implementation the unlocking script parameters were used in the same order (left to right) as in the pseudocode function definition above, meaning leftmost pushed to the stack first. The hardcoded redemption function address is placed to be the first field of the "constant code" part of the locking script, thus pushed to the stack right after the unlocking script data (if not considering variable part that does ECDSA signature verification).

Note, this script implementation is space-optimized, rather than time (since current fee payment in Bitcoin depends solely on TX size).

```
// The 'variable data' part template (P2PKH), followed by redemption address and preimage fetch:
OP_DUP OP_HASH160 2f2ec98dfa6429a028536a6c9451f702daa3a333 OP_EQUALVERIFY
OP_CHECKSIG OP_VERIFY 25daa25932d355826ce60881978f79621f1dfcd9 OP_7 OP_ROLL OP_DUP
// OP_PUSH_TX implementation
OP_HASH256 OP_1 OP_SPLIT OP_1 OP_SPLIT OP_1 OP_SPLIT OP_1 OP_SPLIT OP_1 OP_SPLIT OP_1
OP_SPLIT OP_1 OP_SPLIT OP_1 OP_SPLIT OP_1 OP_SPLIT OP_1 OP_SPLIT OP_1 OP_SPLIT OP_1
OP_SPLIT OP_1 OP_SPLIT OP_1 OP_SPLIT OP_1 OP_SPLIT OP_1 OP_SPLIT OP_1 OP_SPLIT OP_1
OP_SPLIT OP_1 OP_SPLIT OP_1 OP_SPLIT OP_1 OP_SPLIT OP_1 OP_SPLIT OP_1 OP_SPLIT OP_1
OP_SPLIT OP_1 OP_SPLIT OP_1 OP_SPLIT OP_1 OP_SPLIT OP_1 OP_SPLIT OP_1 OP_SPLIT OP_1
OP_SPLIT OP_1 OP_SPLIT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT OP_SWAP OP_CAT OP_SWAP OP_CAT OP_SWAP
OP_CAT OP_SWAP OP_CAT OP_SWAP OP_CAT 00 OP_CAT
4091de8968a1066ab9c6f292823ab43111fb1d0630f3f087e7e42f03533f92a2d779753ff4a0922831cf
7fd3692ec96055665621e97adc95a8a45766e3e0c26a OP_ADD
119ef8f4f04e6864c0608c6d71018e00fb2d17049a8750644299c78b547c2924 OP_MUL
414136d08c5ed2bf3ba048afe6dcaebafeffffffffffffffffffffffff00 OP_TUCK OP_MOD OP_2DUP
OP_SWAP OP_2 OP_DIV OP_GREATERTHAN OP_IF OP_SUB OP_ELSE OP_NIP OP_ENDIF OP_SIZE
OP_DUP 25 OP_ADD 30 OP_SWAP OP_CAT
022100c7a2f4a156ecd42ba9326b31a86c61225dec5a71c3238408f360a9d2f3cf0be002 OP_CAT
OP_SWAP OP_CAT OP_SWAP OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
```

-continued

```
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_SIZE OP_DUP OP_IF OP_1SUB OP_DUP OP_IF OP_SPLIT OP_SWAP
OP_ENDIF OP_ENDIF OP_CAT OP_CAT OP_CAT OP_CAT OP_CAT OP_CAT OP_CAT OP_CAT OP_CAT
OP_CAT OP_CAT OP_CAT OP_CAT OP_CAT OP_CAT OP_CAT OP_CAT OP_CAT OP_CAT OP_CAT
OP_CAT OP_CAT OP_CAT OP_CAT OP_CAT OP_CAT OP_CAT OP_CAT OP_CAT OP_CAT OP_CAT
OP_CAT OP_CAT 41 OP_CAT
03ea9a8e84d865bcd6fc0d1354816bc2eb423a6adf80e42654f1edc101ed033ce3
OP_CHECKSIGVERIFY
// parse sighash preimage into 4 relevant fields: VarInt (length), scriptCode, value (amount being
spent), hashOutputs (hash of all outputs pair with their respective amounts)
68 OP_SPLIT OP_NIP OP_3 OP_SPLIT 17 OP_SPLIT OP_NIP OP_OVER OP_1 OP_SPLIT OP_NIP 00
OP_CAT 17 OP_SUB OP_SPLIT OP_8 OP_SPLIT OP_4 OP_SPLIT OP_NIP 20 OP_SPLIT OP_DROP
// prepare the first output amount
OP_10 OP_ROLL OP_8 OP_NUM2BIN OP_DUP
// construct first output script according to address (smart token locking script or standard 'P2PKH'
for redemption)
OP_11 OP_ROLL OP_DUP OP_8 OP_ROLL OP_EQUAL
    OP_NOTIF OP_6 OP_PICK 76a914 OP_CAT OP_SWAP OP_CAT OP_5 OP_PICK OP_CAT
    OP_ELSE 1976a914 OP_SWAP OP_CAT 88ac OP_CAT
    OP_ENDIF
// pair (concatenate) the first output script with its previously prepared amount
OP_CAT
// construct second optional smart output (if exists)
// enforce immutability of amount of tokens (for both cases - splitting or plain transfer)
OP_8 OP_PICK
    OP_IF OP_9 OP_PICK OP_8 OP_NUM2BIN OP_CAT OP_5 OP_PICK 76a914 OP_CAT OP_9
OP_PICK OP_CAT OP_5 OP_PICK OP_CAT OP_CAT OP_3 OP_ROLL OP_ROT OP_9 OP_PICK OP_ADD
OP_NUMEQUALVERIFY
    OP_ELSE OP_3 OP_ROLL OP_ROT OP_NUMEQUALVERIFY
    OP_ENDIF
// construct third optional standard P2PKH output for change (if exists)
OP_4 OP_PICK
    OP_IF OP_5 OP_PICK OP_8 OP_NUM2BIN OP_CAT 1976a914 OP_5 OP_PICK OP_CAT 88ac
OP_CAT OP_CAT
    OP_ENDIF
// validate that all new outputs with their corresponding amounts passed to unlocking script (on top
of the stack)
// were the correct ones - their hashing result identical to hashOutputs field from preimage (second
to the top of the stack),
// which proved to be consistent with actual spending transaction at the very first step.
OP_HASH256 OP_EQUAL
// constant data part
OP_RETURN 27ed5442ab151b32db7b586d433879d84af3398a
723c903d83cdce9f32246a451652f4b4f469ef78d630bf0f22770cb16bbc187b
```

CONCLUSION

It will be appreciated that the above embodiments have been described by way of example only.

More generally, according to one aspect disclosed herein there is provided a computer-implemented method of sending digital tokens using blockchain transactions, wherein each token is represented by a single unit of an underlying digital asset native units of the blockchain, and wherein the method comprises: generating a first token transaction; and transmitting the first token transaction to the blockchain network, wherein the first token transaction comprises a first token output, the first token output comprising a first token locking script and a first token amount, wherein the first token locking script comprises a variable component and a constant component, wherein the variable component comprises a first payment address, embedded in a payment template, wherein the constant component comprises a token mechanics sub-component, and wherein, when executed alongside an input script of a spending transaction, the input script comprising all but itself of the spending transaction as well as a respective locking script and an amount locked in a previous transaction output that is being spent, the token mechanics sub-component is configured to: obtain one or more data pairs from the input script of the spending transaction, each data pair comprising i) at least a respective payment address included in a respective locking script of the spending transaction outputs and ii) a corresponding amount of the underlying digital asset locked by the respective locking script of that output; verify that one or more outputs of the spending transaction comprise a respective locking script that comprises a) a respective payment script template that includes a predetermined payment address, or b) a respective variable component comprising a respective payment address other than the predetermined payment address, followed by the constant component; and for those one or more outputs of the spending transaction, verify that a total amount of the underlying digital asset locked by the respective locking scripts of the one or more outputs is equal to the first token amount, and wherein the token mechanics sub-component is configured to fail during execution if any of verification steps fail.

The spending transaction comprises at least one output comprising a first locking script format. The spending transaction may comprise more than one output, e.g. a second output and a third output, each having a respective locking script format. For the transaction to be successful, all the locking scripts of these spending transaction's new outputs must have either the same smart token format as the output of previous transaction that is being spent or have standard payment template with predetermined redemption address. The only exception is an optional output (e.g. the last output), the locking script of which, must be a standard payment template with any arbitrary address in it, e.g. used for a change from miners' fee payment, if needed, or for atomic swap payment reception. The input of the spending transaction should contain a data pair for each output and the whole transaction's sighash preimage, the result of hashing of which serves as an input in ECDSA verification formula. The token mechanics sub-component is configured to operate on this assumption—if the assumption is not met, the execution of the token mechanics sub-component will fail, making any tokens operation impossible.

This is also the case if the spending transaction has an additional optional miner fee change output, which does not comprise the constant component of the first token locking script of the output attempted to be spent. Native tokens locked in such an optional output are not part of the preserved amount of newly defined tokens through one transaction to another.

Some parts of the spending transaction are included in the input script in their raw form, while others are included as a result of their hashing.

Each payment address may be embedded in a payment template.

In embodiments, the spending transaction may comprise a first output comprising a first locking script and a second output comprising a second locking script, and wherein the token mechanics sub-component is configured to: verify that the first output of the spending transaction comprises a first locking script that comprises a) a respective payment script template that includes a predetermined payment address, or b) a respective variable component comprising a respective payment address other than the predetermined payment address, followed by the constant component; verify that the second output of the spending transaction, if exists, comprises a second locking script that comprises a) a respective standard payment script template that includes a predetermined payment address, or b) a respective variable component that comprises any address other than the predetermined payment address, followed by the constant component; and verify that, if the second output exists, the total amount of the digital assets locked by the first locking script and the second locking script of the spending transaction is equal to the first token amount.

In embodiments, the token mechanics component may be configured to: if the first locking script of the spending transaction does not comprise the standard payment script template that includes a predetermined payment address, verify that the first locking script comprises respective variable component that comprises a payment address other than the predetermined payment address, followed by the constant component which is identical to corresponding constant component of the first token locking script of previous transaction being spent; and/or if the second locking script of the spending transaction exists, verify that the second locking script comprises respective variable component that comprises any payment address followed by the constant component which is identical to corresponding constant component of the first token locking script of previous transaction being spent.

In embodiments, the constant component may comprise the predetermined payment address.

In other words, the predetermined address is hardcoded in the constant part.

In embodiments, the input script of the spending transaction may comprise a sighash preimage, wherein the preimage comprises the first token locking script, and the first token amount, and wherein the token mechanics sub-component is configured to: extract both the first token locking script and the first token amount of the output being spent from the preimage to perform said verification steps.

The first token locking script included in the input of the spending transaction is the locking script of the output that is attempted to be spent and is identical to the one being executed at that moment. The first token amount included in the input of the spending transaction is the value kept in the output attempted to be spent.

In embodiments, the preimage may comprise a hash of a concatenation of one or more data pairs, each data pair comprising a respective payment address from a respective locking script of the spending transaction and a corresponding amount locked by that respective locking script, and wherein the token mechanics sub-component is configured to: extract the hash of the concatenation of one or more data pairs from the preimage; generate a hash based on the one or more data pairs; and verify that the generated hash is equal to the extracted hash.

Depending on the format of the outputs of the spending transaction, one or more of the "corresponding amounts" may be native tokens, e.g. an output for an optional change or "atomic swap" payment reception, and one or more of the corresponding amounts may be the redefined tokens, e.g. for redemption or token outputs.

In embodiments, the one or more data pairs may be used to generate the hash are either obtained from the input script, or constructed by obtaining the input address and amount pair of the previous output locking script from the preimage.

Any reference to a "hash" may be equated with a "double sha256 hashing". In general any hash function may be used as long as the same hash function is used consistently.

In embodiments, the token mechanics sub-component may be configured to: generate a preimage of the spending transaction data; and verify that the generated preimage of the spending transaction data is equal to the preimage included within the input of the spending transaction.

In embodiments, the input of the spending transaction may comprise a dummy private key and a corresponding dummy public key, and wherein the token mechanics sub-component is configured to: verify that the generated preimage of the spending transaction is equal to the preimage included within the input of the spending transaction by: generating a digital signature using the dummy private key and the hash of the preimage included with the input of the spending transaction; and verifying that the digital signature is a valid signature when validated against the dummy public key and a hash of the generated preimage of the spending transaction.

A dummy private ephemeral private key may be required depending on the particular signature algorithm, e.g. for generating ECDSA signatures.

For instance, the token-mechanics sub-component may comprise an OP_PUSH_TX pseudo-opcode implementation configured to perform said verification of the generated preimage.

In embodiments, the token-mechanics sub-component may be configured to: verify that the respective payment address included in a respective locking script of the spending transaction is the same type as the first payment address included in the variable component of the first token output.

In addition, the token-mechanics sub-component may be configured to verify that the respective output(s) of the spending transaction include a respective payment script template of the same type as the payment script template included in the first token output, e.g. a P2PKH locking script.

In embodiments, the type of the first payment address may be a public key hash address.

In embodiments, the first token amount may comprise a single unit of the underlying digital asset.

In embodiments, the first token amount may comprise multiple units of the underlying digital asset.

In embodiments, the constant component may comprise a data sub-component, and wherein the data sub-component comprises one or both of: a token protocol identifier; and an identifier of a token issuance transaction, wherein the token issuance transaction comprises one or both of i) an issuance contract between a token issuer and an initial token receiver, and ii) an initial token amount.

The constant immutable data sub-component may be placed after an OP_RETURN opcode.

In embodiments, the spending transaction may comprise a third output comprising a third locking script and corresponding third amount, and wherein the token mechanics sub-component is configured to: verify that the third locking script comprises a respective payment address in a predetermined payment type template and its respective corresponding amount. E.g. a PKH address in P2PKH payment template In embodiments, the first token transaction may comprise a first token input that spends a respective token output of a previous token transaction, and wherein the first token input comprises: all but itself of the first token transaction, and a respective locking script and a respective value of the previous token transaction output being spent; and at least one or more data pairs, each data pair comprising at least a payment address included in a respective locking script of the first token transaction and a corresponding amount of the underlying digital asset locked by the respective locking script.

In embodiments, the first token transaction may comprise a second token output, wherein the second token output comprises a second token locking script and a second token amount, wherein the second token locking script comprises a respective variable component and a respective constant component, wherein the respective variable component comprises a second payment address, wherein the respective constant component matches the constant component of the first token locking script.

In embodiments, the first token transaction may comprise a third output, and wherein the third output comprises a third payment address.

In embodiments, the first token input may comprise a first signature generated by a first party, wherein the first token transaction comprises a second input, wherein the second input comprises a second signature generated by a second party, and wherein the first token transaction comprises a payment output that comprises a payment address included in a payment template, and wherein the payment address is linked to the first party.

The payment output is linked to the first party to receive payment from the second party for sold tokens.

According to another aspect disclosed herein there is provided computer equipment comprising: memory comprising one or more memory units; and processing apparatus comprising one or more processing units, wherein the memory stores code arranged to run on the processing apparatus, the code being configured so as when on the processing apparatus to perform any of the embodiments described above.

According to another aspect disclosed herein there is provided a computer program embodied on computer-readable storage and configured so as, when run on computer equipment, to perform any of the embodiments described above.

According to another aspect disclosed herein there is provided a token transaction comprising a first token output, the first token output comprising a first token locking script and a first token amount, wherein the first token locking script comprises a variable component and a constant component, wherein the variable component comprises a first payment address, embedded in a payment template, wherein the constant component comprises a token mechanics sub-component, and wherein, when executed alongside an input script of a spending transaction, the input script comprising all but itself of the spending transaction as well as a respective locking script and an amount locked in a previous transaction output that is being spent, the token mechanics sub-component is configured to: obtain one or more data pairs from the input script of the spending transaction, each data pair comprising i) at least a respective payment address included in a respective locking script of the spending transaction outputs and ii) a corresponding amount of the underlying digital asset locked by the respective locking script of that output; verify that one or more outputs of the spending transaction comprise a respective locking script that comprises a) a respective payment script template that includes a predetermined payment address, or b) a respective variable component comprising a respective payment address other than the predetermined payment address, followed by the constant component; and for those one or more outputs of the spending transaction, verify that a total amount of the underlying digital asset locked by the respective locking scripts of the one or more outputs is equal to the first token amount, and wherein the token mechanics sub-component is configured to fail during execution if any of verification steps fail.

According to another aspect disclosed herein there is provided a computer-readable storage medium having stored thereon the token transaction.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of sending digital tokens using blockchain transactions, wherein each digital token is represented by a single unit of an underlying digital asset native unit of a blockchain network, and wherein the method comprises:
   generating a first token transaction; and
   transmitting the first token transaction to the blockchain network,
   wherein the first token transaction comprises a first token output, the first token output comprising a first token locking script and a first token amount, wherein the first token locking script comprises a variable component and a constant component, wherein the variable component comprises a first payment address, embedded in a payment template, wherein the constant component comprises a token mechanics sub-component, and wherein, when executed alongside an input script of a spending transaction, the input script comprising all but itself of the spending transaction as well as a respective locking script and an amount locked in a previous transaction output that is being spent, the token mechanics sub-component is configured to:
   obtain one or more data pairs from the input script of the spending transaction, each data pair comprising i) at least a respective payment address included in a respective locking script of the spending transaction outputs and ii) a corresponding amount of the underlying digital asset locked by the respective locking script of that output;
   verify that one or more outputs of the spending transaction comprise a respective locking script that comprises a) a respective payment script template that includes a predetermined payment address, or b) a respective variable component comprising a respective payment address other than the predetermined payment address, followed by the constant component; and
   for those one or more outputs of the spending transaction, verify that a total amount of the underlying digital asset locked by the respective locking scripts of the one or more outputs is equal to the first token amount, and
   wherein the token mechanics sub-component is configured to fail during execution if any of verification steps fail.

2. The method of claim 1, wherein the spending transaction comprises a first output comprising a first locking script and a second output comprising a second locking script, and wherein the token mechanics sub-component is configured to:
   verify that the first output of the spending transaction comprises a first locking script that comprises a) a respective payment script template that includes a predetermined payment address, or b) a respective variable component comprising a respective payment address other than the predetermined payment address, followed by the constant component;
   verify that the second output of the spending transaction, if exists, comprises a second locking script that comprises a) a respective standard payment script template that includes a predetermined payment address, or b) a respective variable component that comprises any address other than the predetermined payment address, followed by the constant component; and
   verify that, if the second output exists, the total amount of the digital assets locked by the first locking script and the second locking script of the spending transaction is equal to the first token amount.

3. The method of claim 1, wherein the token mechanics component is configured to:
   if the first locking script of the spending transaction does not comprise the standard payment script template that includes a predetermined payment address, verify that the first locking script comprises respective variable component that comprises a payment address other than the predetermined payment address, followed by the constant component which is identical to corresponding constant component of the first token locking script of previous transaction being spent; and/or
   if the second locking script of the spending transaction exists, verify that the second locking script comprises respective variable component that comprises any payment address followed by the constant component which is identical to corresponding constant component of the first token locking script of previous transaction being spent.

4. The method of claim 1, wherein the constant component comprises the predetermined payment address.

5. The method of claim 1, wherein the input script of the spending transaction comprises a sighash preimage, wherein the preimage comprises the first token locking script, and the first token amount, and wherein the token mechanics sub-component is configured to:
   extract both the first token locking script and the first token amount of the output being spent from the preimage to perform said verification steps.

6. The method of claim 5, wherein the preimage comprises a hash of a concatenation of one or more data pairs, each data pair comprising a respective payment address from a respective locking script of the spending transaction and a corresponding amount locked by that respective locking script, and wherein the token mechanics sub-component is configured to:
   extract the hash of the concatenation of one or more data pairs from the preimage;
   generate a hash based on the one or more data pairs; and
   verify that the generated hash is equal to the extracted hash.

7. The method of claim 6, wherein the one or more data pairs used to generate the hash are either obtained from the input script, or constructed by obtaining the input address and amount pair of the previous output locking script from the preimage.

8. The method of claim 5, wherein the token mechanics sub-component is configured to:
   generate a preimage of the spending transaction data; and
   verify that the generated preimage of the spending transaction data is equal to the preimage included within the input of the spending transaction.

9. The method of claim 8, wherein the input of the spending transaction comprises a dummy private key and a corresponding dummy public key, and wherein the token mechanics sub-component is configured to:
  verify that the generated preimage of the spending transaction is equal to the preimage included within the input of the spending transaction by:
    generating a digital signature using the dummy private key and a hash of the preimage included with the input of the spending transaction; and
    verifying that the digital signature is a valid signature when validated against the dummy public key and a hash of the generated preimage of the spending transaction.

10. The method of claim 1, wherein the token-mechanics sub-component is configured to:
  verify that the respective payment address included in a respective locking script of the spending transaction is the same type as the first payment address included in the variable component of the first token output.

11. The method of claim 1, wherein a type of the first payment address is a public key hash address.

12. The method of claim 1, wherein the first token amount comprises a single unit of the underlying digital asset.

13. The method of claim 1, wherein the first token amount comprises multiple units of the underlying digital asset.

14. The method of claim 1, wherein the constant component comprises a data sub-component, and wherein the data sub-component comprises one or both of:
  a token protocol identifier; and
  an identifier of a token issuance transaction, wherein the token issuance transaction comprises one or both of i) an issuance contract between a token issuer and an initial token receiver, and ii) an initial token amount.

15. The method of claim 2, wherein the spending transaction comprises a third output comprising a third locking script and corresponding third amount, and wherein the token mechanics sub-component is configured to:
  verify that the third locking script comprises a respective payment address in a predetermined payment type template and its respective corresponding amount.

16. The method of claim 1, wherein the first token transaction comprises a first token input that spends a respective token output of a previous token transaction, and wherein the first token input comprises:
  all but itself of the first token transaction, and a respective locking script and a respective amount of the previous token transaction output being spent; and
  at least one or more data pairs, each data pair comprising at least a payment address included in a respective locking script of the first token transaction and a corresponding amount of the underlying digital asset locked by the respective locking script.

17. The method of claim 16, wherein the first token transaction comprises a second token output, wherein the second token output comprises a second token locking script and a second token amount, wherein the second token locking script comprises a respective variable component and a respective constant component, wherein the respective variable component comprises a second payment address, wherein the respective constant component matches the constant component of the first token locking script.

18. The method of claim 17, wherein the first token transaction comprises a third output, and wherein the third output comprises a third payment address.

19. The method of claim 16, wherein the first token input comprises a first signature generated by a first party, wherein the first token transaction comprises a second input, wherein the second input comprises a second signature generated by a second party, and wherein the first token transaction comprises a payment output that comprises a payment address included in a payment template, and wherein the payment address is linked to the first party.

20. Computer equipment comprising:
  memory comprising one or more memory units; and
  processing apparatus comprising one or more processing units, wherein the memory stores code arranged to run on the processing apparatus, the code being configured so as when on the processing apparatus to perform a method of sending digital tokens using blockchain transactions, wherein each token is represented by a single unit of an underlying digital asset native units of a blockchain network, and wherein the method comprises:
  generating a first token transaction; and
  transmitting the first token transaction to the blockchain network,
  wherein the first token transaction comprises a first token output, the first token output comprising a first token locking script and a first token amount, wherein the first token locking script comprises a variable component and a constant component, wherein the variable component comprises a first payment address, embedded in a payment template, wherein the constant component comprises a token mechanics sub-component, and wherein, when executed alongside an input script of a spending transaction, the input script comprising all but itself of the spending transaction as well as a respective locking script and an amount locked in a previous transaction output that is being spent, the token mechanics sub-component is configured to:
  obtain one or more data pairs from the input script of the spending transaction, each data pair comprising i) at least a respective payment address included in a respective locking script of the spending transaction outputs and ii) a corresponding amount of the underlying digital asset locked by the respective locking script of that output;
  verify that one or more outputs of the spending transaction comprise a respective locking script that comprises a) a respective payment script template that includes a predetermined payment address, or b) a respective variable component comprising a respective payment address other than the predetermined payment address, followed by the constant component; and
  for those one or more outputs of the spending transaction, verify that a total amount of the underlying digital asset locked by the respective locking scripts of the one or more outputs is equal to the first token amount, and
  wherein the token mechanics sub-component is configured to fail during execution if any of verification steps fail.

21. A computer program embodied on a non-transitory computer-readable storage medium and configured so as, when run on computer equipment, the computer equipment performs a method of sending digital tokens using blockchain transactions, wherein each token is represented by a single unit of an underlying digital asset native units of a blockchain network, and wherein the method comprises:
  generating a first token transaction; and
  transmitting the first token transaction to the blockchain network,
  wherein the first token transaction comprises a first token output, the first token output comprising a first token locking script and a first token amount, wherein the first token locking script comprises a variable component and a constant component, wherein the variable component comprises a first payment address, embedded in a payment template, wherein the constant component comprises a token mechanics sub-component, and wherein, when executed alongside an input script of a spending transaction, the input script comprising all but itself of the spending transaction as well as a respective locking script and an amount locked in a previous transaction output that is being spent, the token mechanics sub-component is configured to:

obtain one or more data pairs from the input script of the spending transaction, each data pair comprising i) at least a respective payment address included in a respective locking script of the spending transaction outputs and ii) a corresponding amount of the underlying digital asset locked by the respective locking script of that output;

verify that one or more outputs of the spending transaction comprise a respective locking script that comprises a) a respective payment script template that includes a predetermined payment address, or b) a respective variable component comprising a respective payment address other than the predetermined payment address, followed by the constant component; and for those one or more outputs of the spending transaction, verify that a total amount of the underlying digital asset locked by the respective locking scripts of the one or more outputs is equal to the first token amount, and wherein the token mechanics sub-component is configured to fail during execution if any of verification steps fa.

22. A token transaction comprising a first token output, the first token output comprising a first token locking script and a first token amount, wherein the first token locking script comprises a variable component and a constant component, wherein the variable component comprises a first payment address, embedded in a payment template, wherein the constant component comprises a token mechanics sub-component, and wherein, when executed alongside an input script of a spending transaction, the input script comprising all but itself of the spending transaction as well as a respective locking script and an amount locked in a previous transaction output that is being spent, the token mechanics sub-component is configured to:

obtain one or more data pairs from the input script of the spending transaction, each data pair comprising i) at least a respective payment address included in a respective locking script of the spending transaction outputs and ii) a corresponding amount of an underlying digital asset locked by the respective locking script of that output;

verify that one or more outputs of the spending transaction comprise a respective locking script that comprises a) a respective payment script template that includes a predetermined payment address, or b) a respective variable component comprising a respective payment address other than the predetermined payment address, followed by the constant component; and for those one or more outputs of the spending transaction, verify that a total amount of the underlying digital asset locked by the respective locking scripts of the one or more outputs is equal to the first token amount, and wherein the token mechanics sub-component is configured to fail during execution if any of verification steps fail.

23. A non-transitory computer-readable storage medium having stored thereon a token transaction comprising a first token output, the first token output comprising a first token locking script and a first token amount, wherein the first token locking script comprises a variable component and a constant component, wherein the variable component comprises a first payment address, embedded in a payment template, wherein the constant component comprises a token mechanics sub-component, and wherein, when executed alongside an input script of a spending transaction, the input script comprising all but itself of the spending transaction as well as a respective locking script and an amount locked in a previous transaction output that is being spent, the token mechanics sub-component is configured to:

obtain one or more data pairs from the input script of the spending transaction, each data pair comprising i) at least a respective payment address included in a respective locking script of the spending transaction outputs and ii) a corresponding amount of an underlying digital asset locked by the respective locking script of that output;

verify that one or more outputs of the spending transaction comprise a respective locking script that comprises a) a respective payment script template that includes a predetermined payment address, or b) a respective variable component comprising a respective payment address other than the predetermined payment address, followed by the constant component; and for those one or more outputs of the spending transaction, verify that a total amount of the underlying digital asset locked by the respective locking scripts of the one or more outputs is equal to the first token amount, and wherein the token mechanics sub-component is configured to fail during execution if any of verification steps fail.

* * * * *